United States Patent [19]
Häring et al.

[11] Patent Number: 5,896,900
[45] Date of Patent: Apr. 27, 1999

[54] METHOD AND APPARATUS FOR FILLING A LIQUID VOLUME INTO RECEPTACLES

[75] Inventors: Franz Häring, Neutraubling; Hans-Ulrich Bräunling, Nittendorf; Willibald Altweck, Neutraubling, all of Germany

[73] Assignee: Krones AG Hermann Kronseder Maschinenfabrik, Neutraubling, Germany

[21] Appl. No.: 08/535,014

[22] PCT Filed: Feb. 2, 1995

[86] PCT No.: PCT/EP95/00377

§ 371 Date: Dec. 4, 1995

§ 102(e) Date: Dec. 4, 1995

[87] PCT Pub. No.: WO95/21789

PCT Pub. Date: Aug. 17, 1995

[30] Foreign Application Priority Data

Feb. 8, 1994 [DE] Germany ............... 44 03 824

[51] Int. Cl.[6] ............................................. B65B 1/30
[52] U.S. Cl. ........................... 141/196; 141/95; 141/129
[58] Field of Search ............................. 141/129, 196, 141/198, 95; 222/64, 67, 444

[56] References Cited

U.S. PATENT DOCUMENTS

| | | |
|---|---|---|
| 5,090,594 | 2/1992 | Randall, Jr. et al. ............ 222/1 |
| 5,184,753 | 2/1993 | Horak . |
| 5,480,063 | 1/1996 | Keyes et al. ............... 222/64 |

FOREIGN PATENT DOCUMENTS

| | | |
|---|---|---|
| 75492A1 | 9/1982 | European Pat. Off. . |
| 106971 | 8/1983 | European Pat. Off. . |
| 91 13 294 U | 10/1991 | Germany . |

Primary Examiner—David J. Walczak
Assistant Examiner—Timothy L. Maust
Attorney, Agent, or Firm—Tilton, Fallon, Lungmus & Chestnut

[57] ABSTRACT

In a method for filling a liquid volume into receptacles wherein liquid is admitted into a volumetric metering chamber by opening an inlet valve, the inlet valve is closed when an upper switching level is reached, the liquid is discharged from the metering chamber into a receptacle by opening the outlet valve, and the outlet valve is closed when a lower switching level is reached, the upper filling level actually obtained after closing of the inlet valve is measured, as well as the lower filling level actually obtained after closing of the outlet valve. With the values obtained thereby, the upper and lower switching levels are corrected, whereby the desired liquid volume can exactly be observed independently of pressure and flow conditions.

3 Claims, 1 Drawing Sheet

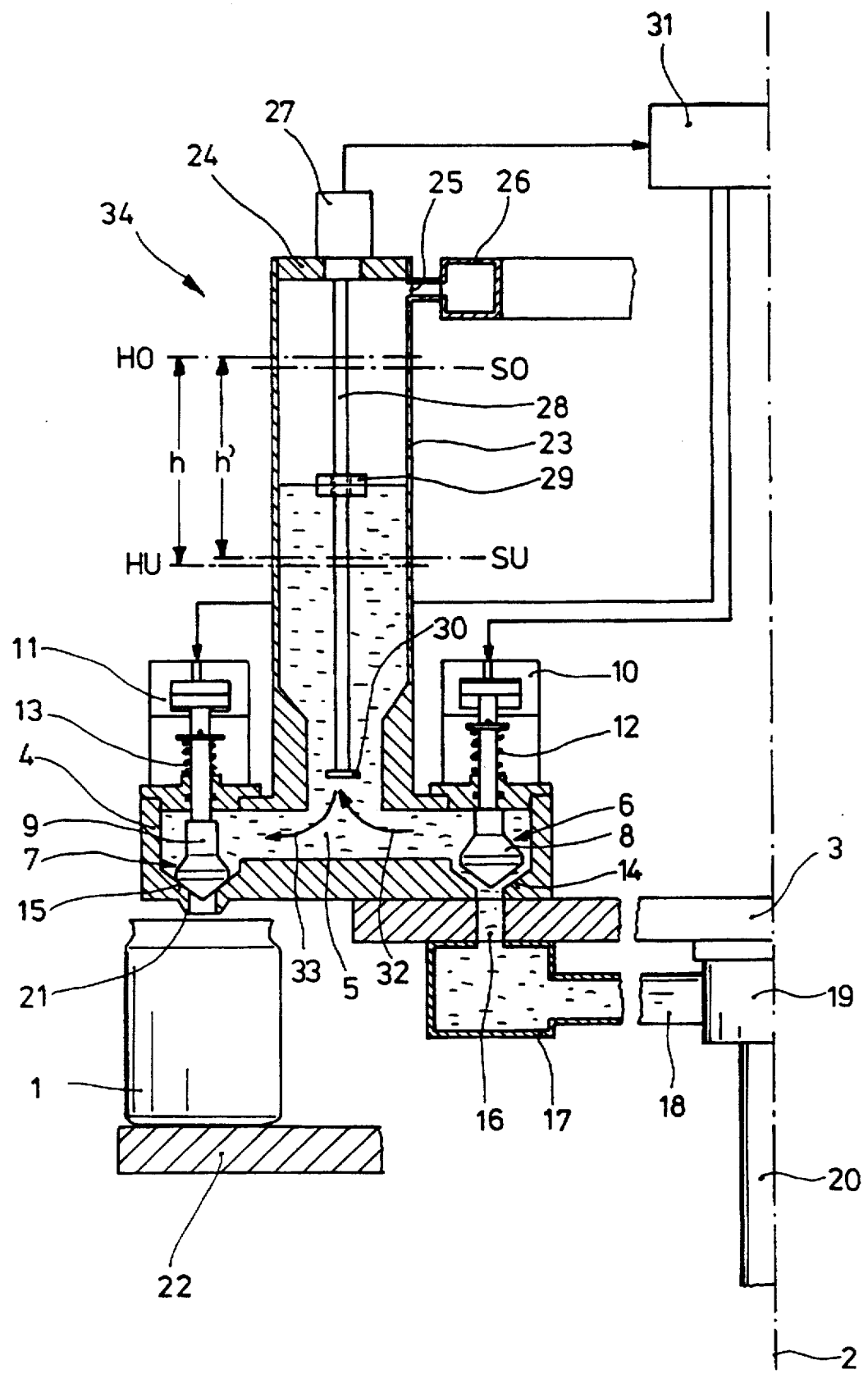

METHOD AND APPARATUS FOR FILLING A LIQUID VOLUME INTO RECEPTACLES

DESCRIPTION

The present invention relates to a method for filling a liquid volume into receptacles according to the preamble of claim 1.

Such a method is known from U.S. Pat. No. 5,184,753. Delay times which are due to the system and occur between the reaching of the predetermined upper and lower switching levels and the final closing of the inlet valve and the outlet valve, respectively, effect uncontrolled after-running, which results in an increase in the liquid volume defined by the height difference between the two switching levels and the cross-section of the metering chamber. It is especially disadvantageous that the errors in the region of the upper and lower switching levels add up and that the errors in the region of the upper switching level are additionally influenced by pressure variations in the liquid feeding line. This known method is therefore not suited for exactly filling, in particular, relatively small receptacles such as beverage cans or beverage bottles.

Although the known method provides for a correction possibility, it is only the temperature of the liquid in the metering chamber that is taken into account. In accordance with the measured temperature the cross-section of the metering chamber is increased or reduced by extending or retracting displacers, whereby the desired weight of the liquid amount to be filled can be kept constant.

It is the object of the present invention to considerably improve the filling accuracy as to volume with the aid of simple means in a method of the above-mentioned type.

This object is attained according to the invention by the features specified in the characterizing part of claim 1.

In a method of the invention, observance of the desired liquid volume is considerably improved independently of the flow and pressure conditions during liquid supply, of the delay times due to the system, etc. Hence, it is possible to fill relatively small receptacles with a filling volume of, for instance, 0.33 liter in an exact manner and at a high speed.

Advantageous developments of the invention are shown in the subclaims.

An embodiment of the invention shall now be described with reference to the drawing. The drawing is a vertical section through an apparatus for filling a liquid, such as a beverage, in portions into cans 1 under atmospheric pressure. The apparatus comprises a rotor 3 which rotates about a vertical rotary axis 2 and has the shape of a circular disc or a circular ring. A plurality of similar filling units 34 are mounted in uniformly distributed fashion on the circumference of rotor 3 with a respective valve block 4, and a cavity 5 extending substantially radially relative to rotary axis 2. An inlet valve 6 is provided at the inner end of said cavity and an outlet valve 7 at the outer end thereof. The two valves 6, 7 have each a vertically movable valve body 8, 9 which can be lowered by a separate actuator 10, 11 in the form of a pneumatic cylinder against the force of pressure springs 12, 13. Valve bodies 8, 9 cooperate with downwardly conically tapered valve seats 14, 15 in valve block 4 and are sealingly guided upwardly out of said block.

A short channel 16 which terminates in an annular reservoir 17 for the liquid to be filled follows valve seat 14 of inlet valve 6. Reservoir 17 is secured to the bottom side of rotor 3 and is supplied with liquid via a plurality of radial conduits 18, a rotary distributor 19 which is concentric to rotary axis 2, and a riser 20. The liquid is supplied at sufficient overpressure either via a pump (not shown) with pressure control or via a pre-run container (also not shown) which is arranged at a level higher than that of the filling unit 34.

Valve seat 15 of outlet valve 7 is followed by an outlet nozzle 21 in the form of a short tubular attachment to the bottom side of valve block 3. Outlet nozzle 21 terminates at a distance above the upper edge of a can 1 to be filled, so that it is possible to supply the can in unhindered fashion to a rotary table 22 which rotates together with rotor 3 about rotary axis 2, and to remove it again from said table after filling. Cans 1 are supplied and removed, for instance, by transport stars (not shown) with an interposed guide arc.

A cylindrical metering chamber 23 with a vertical center axis is centrally arranged between the two actuators 10, 11 on the upper side of valve block 4. The metering chamber terminates with its lower tapered opening directly in cavity 5, namely in the area between inlet valve 6 and outlet valve 7. The metering chamber 23 consists essentially of a pipe member with calibrated bore and is closed on the upper side by a lid 24. A lateral opening 25 which is connected to an annular channel 26 is formed directly below lid 24 in the metering chamber 23. Gas is exchanged through opening 25 and annular channel 26 during filling and emptying of the metering chamber 23, for which purpose annular channel 26 is connected to atmosphere.

A level probe 27 which sweeps over the entire height of the metering chamber 23 is mounted within lid 24. The level probe 27 comprises a straight circular rod 28, which is centrally seated in the metering chamber 23. An annular float 29 is guided on rod 28 to be freely movable in vertical direction. The lower end position of said float is defined by a disc-shaped stop 30 which is mounted on the bottom end of rod 28. The height position of float 29 with respect to rod 28 is, for instance, sensed by an inductive displacement sensor inside rod 28 or with the aid of sound vibrations which are produced in rod 28 and reflected by float 29. Any measuring method with the aid of which the position of float 29 and thus the filling level in the metering chamber 23 can be measured with adequate accuracy, preferably in the range of millimeter fractions, is suited. The level probe 27 supplies a corresponding measuring signal, for instance in the form of an electric voltage, to a closed electronic control means 31. The means receives the measurement signal continuously or discontinuously at sufficiently short time intervals and is informed about the instantaneous filling level in metering chamber 23 at all times during a filling operation. The control means 31 operates with one or several microprocessors and controls the inlet valve 6 and the outlet valve 7 by correspondingly airing or venting the actuators 10, 11 by using solenoids (not shown).

The method which can be performed with the above-described apparatus takes place in the following manner under the control of the control means 31: In the initial phase the two valves 6, 7 are closed and cavity 5 and the lower portion of the metering chamber 23 are either filled with liquid in case of a preceding filling operation, or they are entirely empty in the absence of a preceding filling operation. Inlet valve 6 is first opened in the still closed state of outlet valve 7 and liquid flows from the reservoir 17 via inlet valve 6 and cavity 5 in the direction of arrow 32 from below into the metering chamber 23. This phase is illustrated in the drawing. Float 29 is correspondingly lifted by the liquid, and the filling level in the metering chamber 23 is monitored by the level probe 27.

As soon as the liquid level reaches a predetermined upper switching level SO, a closing of inlet valve 6 is initiated by supplying compressed air to the servomotor 10. On account of electrically and pneumatically caused delay times, some liquid will still follow until inlet valve 6 is finally closed. An actual upper filling level HO is obtained which, apart from the delay times, also depends on the flow and pressure conditions, especially in reservoir 17, and may therefore vary from filling operation to filling operation. The actual upper filling level HO is recorded by level probe 27 and received by control means 31. The means now defines a lower switching level SU whose position depends in a first variant of the method on the actual upper filling level HO, the desired filling volume V and the free cross-section of metering chamber 23. By dividing volume V by the cross-section, it is possible to calculate height h' by which the lower switching level SU is lower than the actual upper filling level HO.

In the meantime an empty can 1 was placed on the rotary table 22 below the corresponding fillig unit 34, and outlet valve 7 is now opened with inlet valve 6 remaining closed. Liquid flows in the direction of arrow 33 downwards from the metering chamber 23 via cavity 5, outlet valve 7 and outlet nozzle 21 into can 1. Float 29 drops accordingly and level probe 27 monitors the instantaneous filling level in the metering chamber 23 again.

As soon as the liquid level reaches the given lower switching level SU, outlet valve 7 is closed by supplying compressed air to servomotor 11. The filling operation is thereby concluded, and a specific volume V of the liquid has flown into can 1. Possibly existing, pneumatically or electrically caused delays between the reaching of the lower switching level SU and the final closing of outlet valve 7 are not automatically taken into account in the above-described first variant of the filling method. After-running which is possibly caused thereby is relatively small, on the one hand, because of the low static pressure and the correspondingly low outflow speed and is virtually constant on the other hand.

However, it is possible to set the lower switching level SU to be slightly higher in comparison with the theoretical value, as is defined by the cross-section of the metering chamber 23 and the desired volume V, by manually entering a correction factor in the control means 31, thereby taking into account possible after-running.

In a second variant of the method of the invention, the metering chamber 23 is first filled in the same manner as in the above-described first variant. Moreover, closing of the outlet valve 7 is started when a predetermined lower switching level US has been reached. Subsequently, however, the lower filling level HU which is actually obtained in the metering chamber 23 after the outlet valve 7 has been completely closed is measured by the level probe 27 and reported to the control means 31. The control means calculates the actually filled volume V from the height difference h between the actually measured values for the upper filling level HO and the lower filling level HU. When the actual filling volume V is greater than the desired theoretical value, height h' is slightly reduced in the next filling operation in the same filling unit 34 and the lower filling level SU is slightly raised thereby as a rule. This can be performed either in an adaptive manner by stepwise lifting from filling operation to filling operation until the desired theoretical filling volume V is reached, or the necessary correction of the lower switching level SU is defined on the basis of the height difference between the lower switching level SU and the actually measured lower filling level HU. In the reverse case, the height difference h' is increased and the lower switching level SU is thus lowered when the actually filled volume V is smaller than the theoretical volume.

The upper filling level HO is newly measured during each filling operation to compensate for possible pressure variations in reservoir 17. The predetermined lower switching level SU is then newly defined during every filling operation. The lower filling level HU, too, can be newly measured during every filling operation. However, since the flow conditions inside the filling unit 34 are substantially constant, it is also possible to perform measurements at specific time intervals or after a specific number of filling operations.

The upper switching level SO remains unchanged during normal filling operation. It defines the filling speed via the static height. Upon change to another can size or another liquid, the upper switching level SO and/or the volume V can also be changed. The lower switching level SU will then be adapted automatically by the control means.

We claim:

1. A method for filling a liquid volume into receptacles, the liquid being admitted into a volumetric metering chamber by opening an inlet valve in the closed state of an outlet valve, closing of said inlet valve being started when an upper switching level is reached in said metering chamber, the liquid being discharged from said metering chamber into a receptacle by opening said outlet valve in the closed state of said inlet valve, and closing of said outlet valve being started when a lower switching level is reached in said metering chamber, including the steps of:

the upper filling level (HO) actually obtained after closing of said inlet valve (6) and/or said outlet valve (7) is measured in said metering chamber (23), and the resultant value is used for correcting or defining an upper switching level (so) and/or a lower switching level (SU) during the current and/or subsequent filling operation;

the lower filling level (HU) actually obtained after closing of said outlet valve (7), is measured in said metering chamber (23), and the resultant value is used for correcting or defining a lower switching level (SU) in a subsequent filling operation.

2. Method according to claim 1, wherein the valve for said lower switching level (SU) is adaptively changed.

3. Method according to claim 1, wherein the value for said lower switching level (SU) is defined on the basis of the actual upper filling level (HO) of the current filling operation as measured, the lower filling level (HU) of at least one preceding filling operation as measured, the desired filling volume (V) and a free cross-section of said metering chamber (23).

* * * * *

UNITED STATES PATENT AND TRADEMARK OFFICE
CERTIFICATE OF CORRECTION

PATENT NO. : 5,896,900
DATED : April 27, 1999
INVENTOR(S) : Franz Haring et al

It is certified that error appears in the above-indentified patent and that said Letters Patent is hereby corrected as shown below:

In Column 4, Claim 1, Line 42 "(so)" should be --(SO)--.

Signed and Sealed this

Sixteenth Day of November, 1999

Attest:

Q. TODD DICKINSON

*Attesting Officer*          *Acting Commissioner of Patents and Trademarks*